United States Patent [19]
Lamb

[11] Patent Number: 6,005,317
[45] Date of Patent: *Dec. 21, 1999

[54] ADJUSTABLE MAGNETIC COUPLER

[75] Inventor: Karl J. Lamb, Port Angeles, Wash.

[73] Assignee: Magna Force, Inc., Port Angeles, Wash.

[*] Notice: This patent is subject to a terminal disclaimer.

[21] Appl. No.: 09/028,872

[22] Filed: Feb. 20, 1998

Related U.S. Application Data

[63] Continuation-in-part of application No. 08/834,094, Apr. 14, 1997, Pat. No. 5,834,872, which is a continuation-in-part of application No. 08/803,365, Feb. 20, 1997, Pat. No. 5,880,548, which is a continuation-in-part of application No. 08/546,066, Oct. 20, 1995, Pat. No. 5,668,424, which is a continuation of application No. 08/192,375, Feb. 7, 1994, Pat. No. 5,447,094, which is a continuation-in-part of application No. 08/065,867, May 21, 1993, Pat. No. 5,477,093.

[51] Int. Cl.$^6$ .................................................. H02K 49/00
[52] U.S. Cl. ........................ 310/103; 310/114; 192/18 B; 192/84.5
[58] Field of Search ............................... 310/103, 90, 92, 310/93, 105, 114; 192/84.1, 84.5, 70, 18 R, 18 B

[56] References Cited

U.S. PATENT DOCUMENTS

| | | | |
|---|---|---|---|
| 4,285,420 | 8/1981 | Sekella | 192/84.51 |
| 4,566,574 | 1/1986 | Marshall | 192/84.91 |
| 5,119,918 | 6/1992 | Pardee | 192/18 B |
| 5,238,095 | 8/1993 | Pedu | 192/84.1 |
| 5,600,194 | 2/1997 | Toukola | 310/105 |
| 5,834,872 | 11/1998 | Lamb | 310/103 |

*Primary Examiner*—Nestor Ramirez
*Assistant Examiner*—Joseph Waks
*Attorney, Agent, or Firm*—Seed and Berry LLP

[57] ABSTRACT

An adjustable coupler has a group of magnet rotors with permanent magnets separated by air gaps from non-ferrous conductor elements presented by a group of conductor rotors. The air gaps are adjusted by axial movement of one of the groups relative to the other to vary the slip of the coupler and control the load speed under varying load conditions.

37 Claims, 7 Drawing Sheets

ADJUSTABLE MAGNETIC COUPLER

CROSS-REFERENCE(S) TO RELATED APPLICATIONS

This application is a continuation-in-part of copending U.S. patent application Ser. No. 08/834,094, filed Apr. 14, 1997, now U.S. Pat. No. 5,834,872, which is a continuation-in-part of application Ser. No. 08/803,365, filed Feb. 20, 1997, now U.S. Pat. No. 5,880,548, which is a continuation-in-part of U.S. Pat. No. 5,668,424, Ser. No. 08/546,066, filed Oct. 20, 1995, issued Sep. 16, 1997, which is a continuation of U.S. Pat. No. 5,447,094, Ser. No. 08/192,375, filed Feb. 7, 1994, issued Dec. 19, 1995, which is a continuation-in-part of U.S. Pat. No. 5,477,093, Ser. No. 08/065,867, filed May 21, 1993, issued Dec. 19, 1995.

TECHNICAL FIELD

The present invention relates to permanent magnet couplers of the type having a magnet rotor on one shaft spaced by an air gap from a conductor rotor on another shaft, the conductor rotor having a ferrous-backed electroconductive element located opposite magnets presented by the magnet rotor. More particularly, the invention relates to adjustment of the air gap.

BACKGROUND OF THE INVENTION

Induction motors are used, for example, to drive fans, blowers, pumps and compressors. It has been recognized that when these motors are operated at full speed they normally have excess capacity as compared to the load requirements, and this excess capacity is compounded when the load is variable. It has also been recognized that if the output of the motors could be adjusted to provide only the needed power, a significant reduction of energy usage would result. Hence, variable speed drives (VSD's) have been developed in the form of electronic devices which match motor speed to that required for a given application. A typical VSD rectifies incoming AC voltage and current into DC, then inverts the DC back to AC at a different voltage and frequency. The output voltage and frequency is determined by the actual power needs and is set automatically by a control system or by an operator.

Heretofore, VSD's have generally been so expensive that they have not been used extensively for energy savings. It has been reported that VSD's require the availability of highly trained maintenance personnel and shorten motor life.

SUMMARY OF THE INVENTION

The present invention aims to provide a mechanical alternative to VSD's which is far more economical, will automatically maintain the speed of the load to a preset speed as the load requirements vary, and will not require modification of the electric motor or adjustment of the input voltage or frequency. A further object is to provide a permanent magnet coupling which will function in place of VSD's without overheating.

In my prior U.S. Pat. No. 5,477,094 there is shown a magnetic coupler in which a magnet rotor unit is straddled by two conductor rotors which are connected together to rotate as a conductor rotor unit on one shaft while the magnet rotor unit is mounted to rotate on a second shaft. The magnet rotor unit has a set of permanent magnets arranged with their opposite poles spaced by air gaps from ferrous-backed electroconductive rings mounted on respective of the conductor rotors. Rotation of one of the two shafts results in rotation of the other shaft by magnetic action without there being any direct mechanical connection between the shafts.

My prior patent also discloses the concept of having two magnet rotors rather than a single magnet rotor unit, with each magnet rotor having a respective set of permanent magnets spaced by an air gap from one of the electroconductive element presented by the conductor rotors. The two magnet rotors are axially movable relative to one another and are spring biased apart. By the present invention the magnet rotors are positively positioned relative to each other such as to vary their axial positions automatically at will from a remote control location to provide by air gap adjustment a variable torque from a constant speed motor to a variable torque load operating at a lower constantly maintained speed.

Instead of spring biasing the two magnet rotors as discussed above, in accordance with the present invention the positions of the magnet rotors are controlled from a stationary control mechanism which communicates with an adjusting mechanism operating on the magnet rotors to selectively move them toward one another to widen the air gaps or to move them further apart to narrow the air gaps. Gap adjustment varies the rotational slip between the magnet rotor units and the conductor rotor units for a given torque load and hence effects the speed of the load. For a given torque load the air gaps can be adjusted to provide the torque at a preset rotational speed differential below the speed of the motor. Assuming that the torque output of the motor at the established operating speed of the motor is adequate relative to the load, it has been found that since the power output of the motor adjusts automatically to the power requirement of the load there are substantial energy savings. Furthermore, by the present invention, the normal speed differential (slip) between the magnet rotors and conductor rotors does not result in overheating.

The adjusting means of the present invention may take, for example, a form in which one of the magnet rotors is moved axially as, for example, by a reversible servo motor, and the other magnet rotor is responsively caused to move axially a like amount response to a mechanism operating between the magnet rotors. This mechanism may include a central rotor member mounted on the output shaft and having swing arm units swing-mounted centrally on the central rotor member and slidemounted relative to the magnet rotors at the ends of the swing arms so that the magnet rotors move equally in opposite axial directions whenever one of the magnet rotors is moved axially. It is preferred that magnet rotors be slide-mounted on pins projecting from the central rotor member in parallel relation to the output shaft, but the magnet rotors can also be slide-mounted directly on the output shaft.

DETAILED DESCRIPTION OF THE INVENTION

Figure 1:
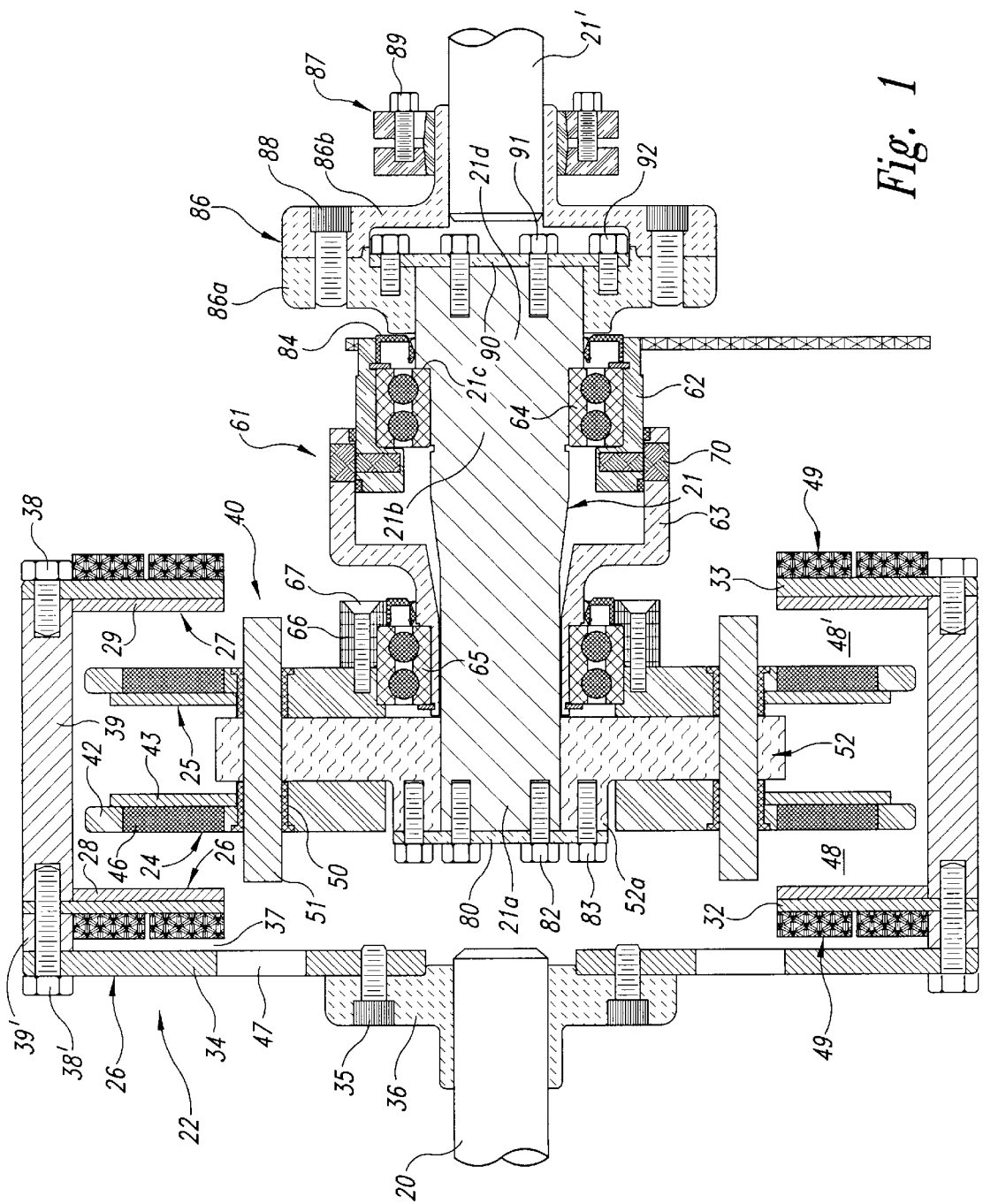
FIG. 1 is a longitudinal sectional view of a first embodiment of the invention shown in a wide air gap position and taken as indicated by line 1—1 in FIG. 5.
Figure 2:
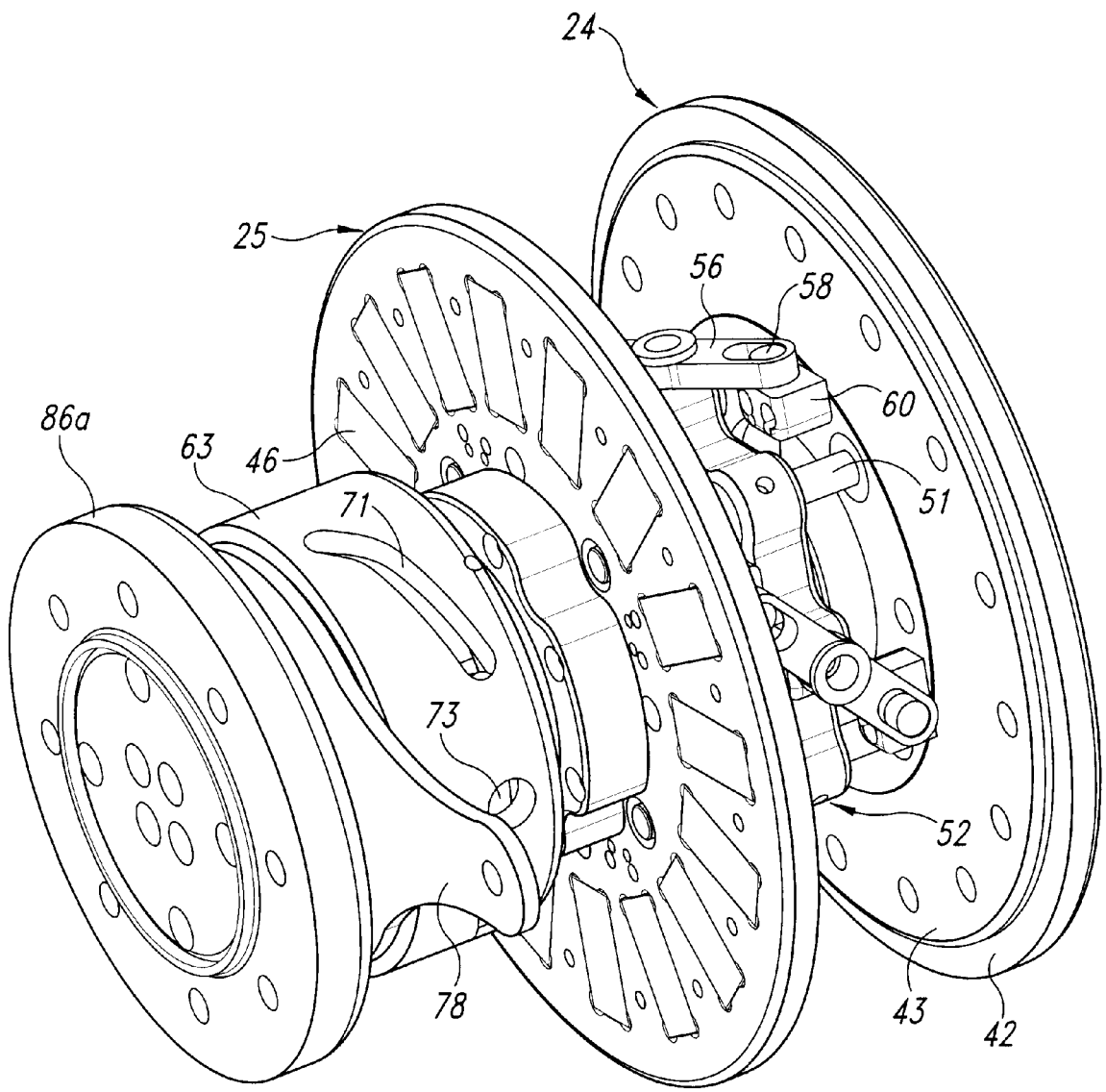
FIG. 2 is a perspective view of the first embodiment without the conductor rotors and showing the air gap adjusting mechanism extended so that the magnet rotors are in a narrow air gap position.
Figure 3:
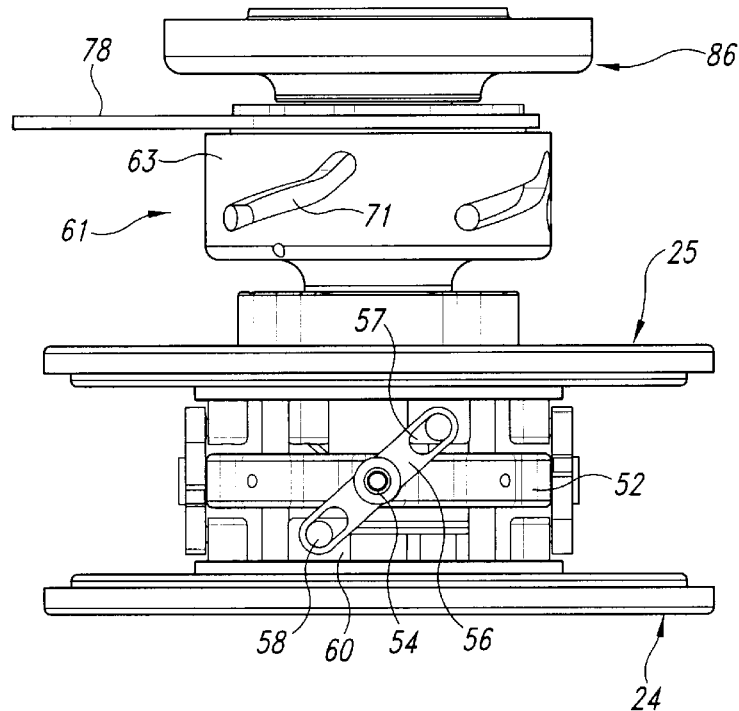
FIG. 3 is a plan view corresponding to FIG. 2.

Referring to the drawings, coaxial input and output shafts 20–21 have mounted thereon a conductor rotor unit 22 and a pair of magnet rotors 24–25. The conductor rotor unit has two axially spaced conductor rotors 26-27 having respective conductor rings 28–29 facing toward one another and formed from a non-ferrous material with high electrical conductivity such as copper. These conductor rings 28–29 are mounted as by screws on respective backing rings 32–33 which preferably are mild steel. The conductor rotor unit 22 also includes a rotor disc 34 mounted by bolts 35 on a hub 36 and spaced axially from the conductor rotor 28 by a ventilation gap 37. The backing rings 32–33 are connected together and to the disc 34 in axially spaced relation by sets of bolts 38–38' threaded into spacer sleeves 39–39' located outwardly of the orbits of the magnet rotors 24–25. Conductor rotor 27 is separated from the output shaft 21 by an annular clearance space 40. The hub 36 is mounted on input shaft 20 as by a wedge-type coupling or a key connection.

Each of the magnet rotors 24–25 has a non-ferrous mounting disc: 42 backed by a ferrous backing disc 43, preferably of mild steel. The mounting discs 42 may be aluminum or a suitable non-magnetic composite, and each is formed with a set of equally spaced rectangular cutouts 44 arranged in a circle and receiving a respective set of permanent magnets 46 seated against the respective backing disc 43. Adjacent magnets have their polarities reversed. The magnets 46 are spaced by air gaps 48–48' from the conductor rings 28–29 of the conductor rotor unit 22.

Figure 9:
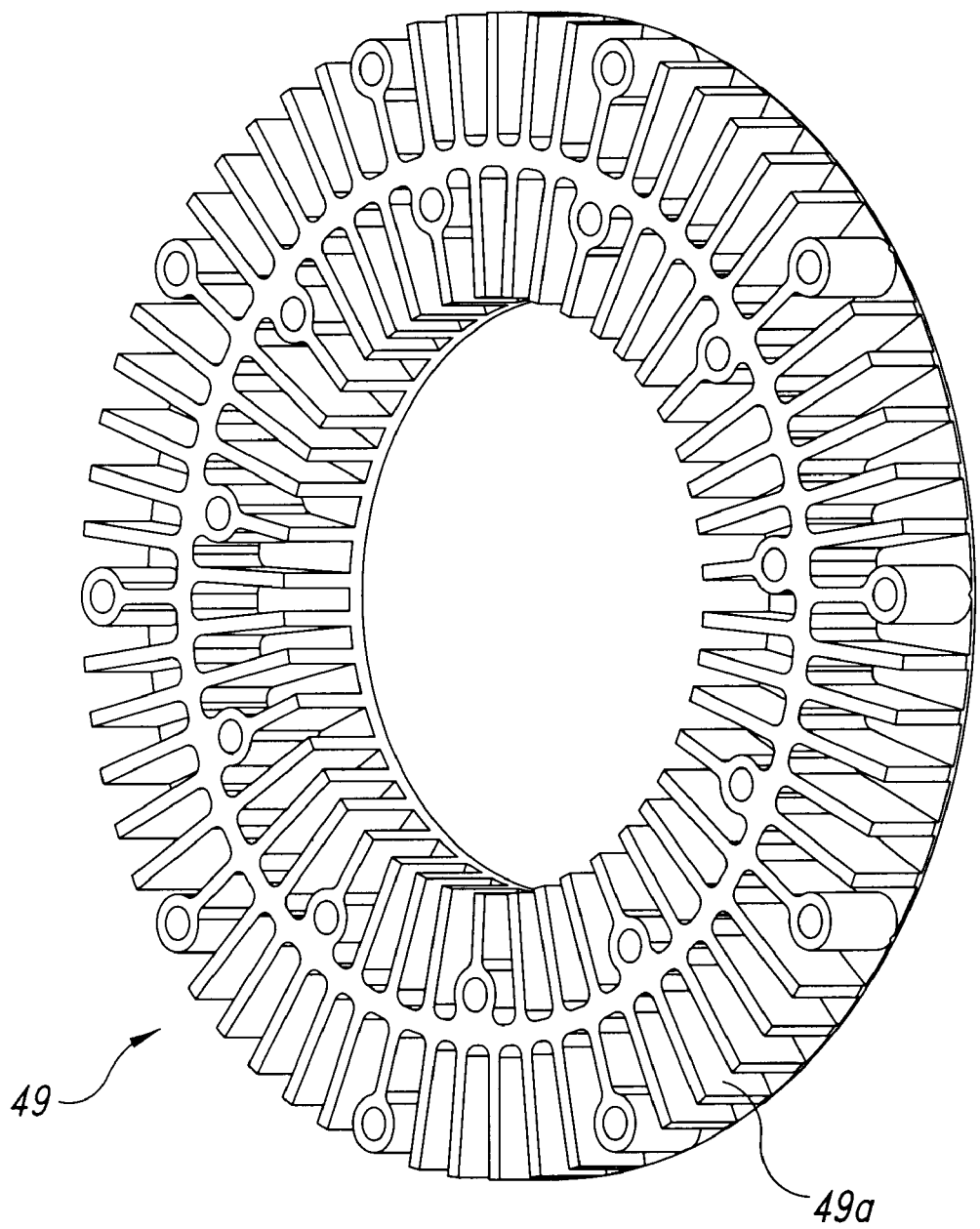
FIG. 9 is a perspective view of one of the fan rings.

Preferably the disc 34 is formed with ventilation holes 47 to assist in the circulation of air through the ventilation gap 37 and the air gap 48 for cooling the conductor ring 29. Cooling air for the conductor ring 28 is free to enter the air gap 48 from the clearance space 40. The conductor rotors may also be provided with a screw-mounted fan ring 49 (FIG. 9) presenting multiple blade elements 49a to increase the air flow adjacent the conductor rings 27, 28 for cooling. It is to be understood that providing added ventilation for cooling of the conductor ring 28 by way of the ventilation space 37 and/or ventilation holes 47 or fan blades 49a may not be required for all applications in which case the backing ring 32 would be mounted on the disc 34 or the conductor ring 28 could be mounted directly on the disc 34 which thereupon could serve as the ferrous backing for the conductor ring 28 rather than the backing ring 32.

In accordance with the present invention the magnet rotors 24–25 are mounted so as to rotate in unison with the output shaft 21 and also be axially movable relative to one another in opposite axial directions for adjustment of the air gaps 48–48'. To this end the magnet rotors 24–25 are preferably slide-mounted by bushings 50 on opposite axial end portions of combination support and guide pins 51. These pins project in opposite axial directions from a fifth rotor 52 which is mounted on the output shaft 21 midway between the conductor rings 28–29. As an alternative arrangement, the magnet rotors 24–25 could be slide-mounted on the output shaft 21 rather than on the pins 51.

Push-pull means is provided to move the magnet rotors 24–25 axially in unison along the rotary axis of the splined output shaft 21 in opposite directions to vary the width of the air gaps 48–48'. The push-pull means may comprise a first push-pull mechanism extending through the opening 40 for axially moving the magnet rotor 25, and a second push-pull mechanism extending between the magnet rotors for moving the magnet rotor 24 responsive to movement of the magnet rotor 25 by the first mechanism. In the illustrated embodiment the second mechanism includes the fifth rotor 52 and related pins 51.

Figure 4:
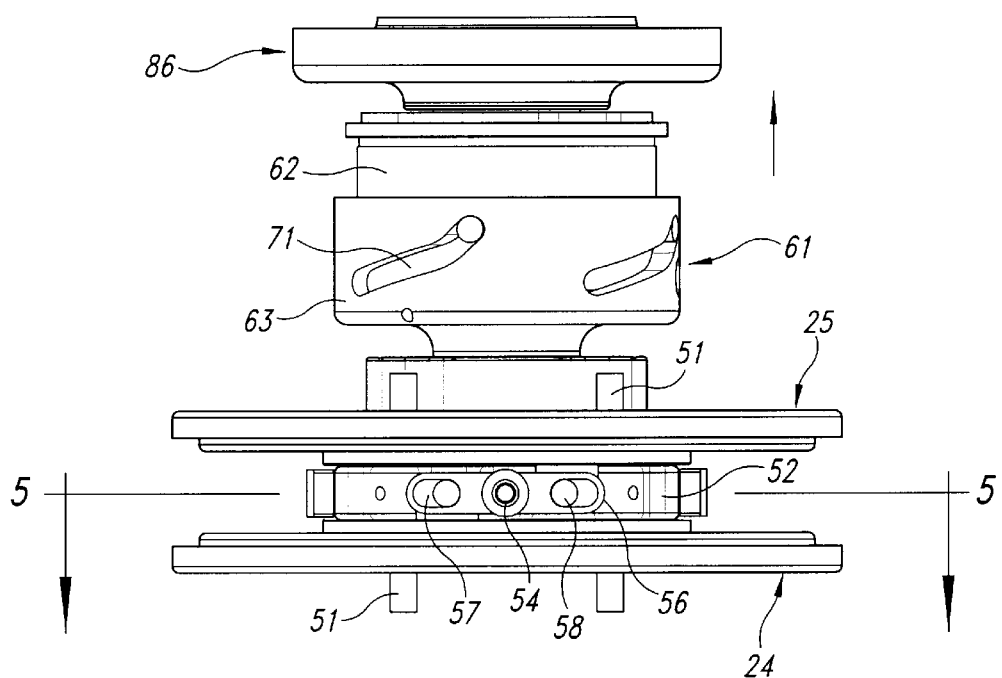
FIG. 4 is a plan view like FIG. 3, but with the air gap adjustment mechanism retracted so that the magnet rotors are in a wide air gap position.
Figure 5:
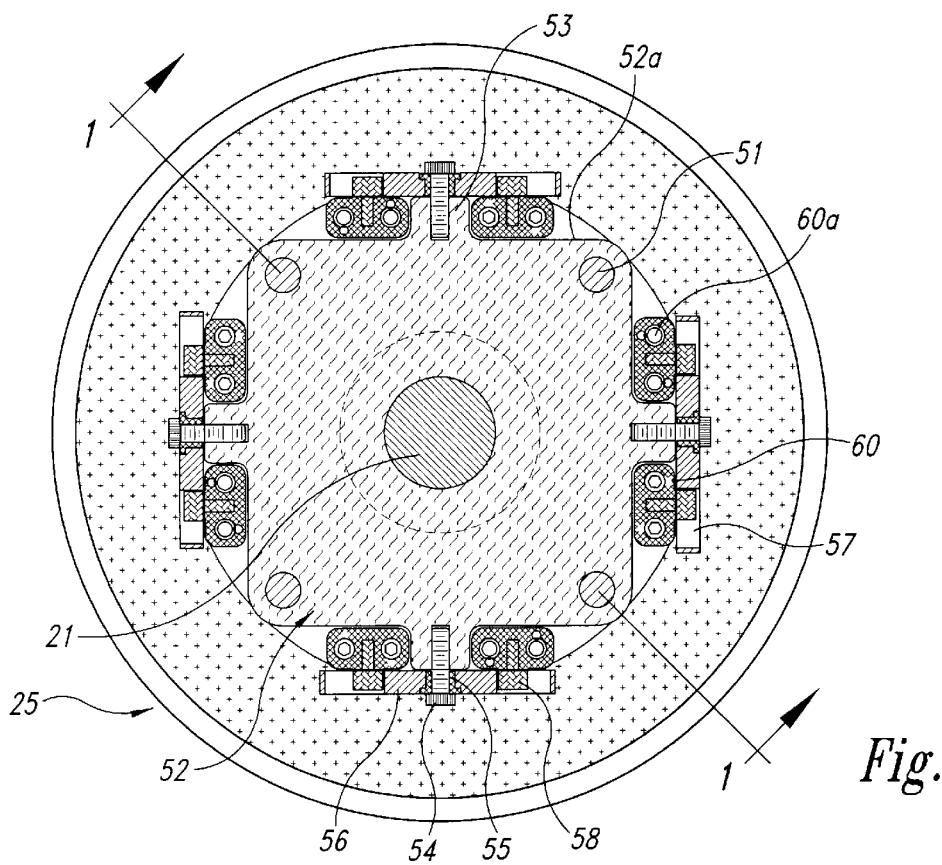
FIG. 5 is a transverse sectional view taken as indicated by line 4—4 in FIG. 4.
Figure 6:
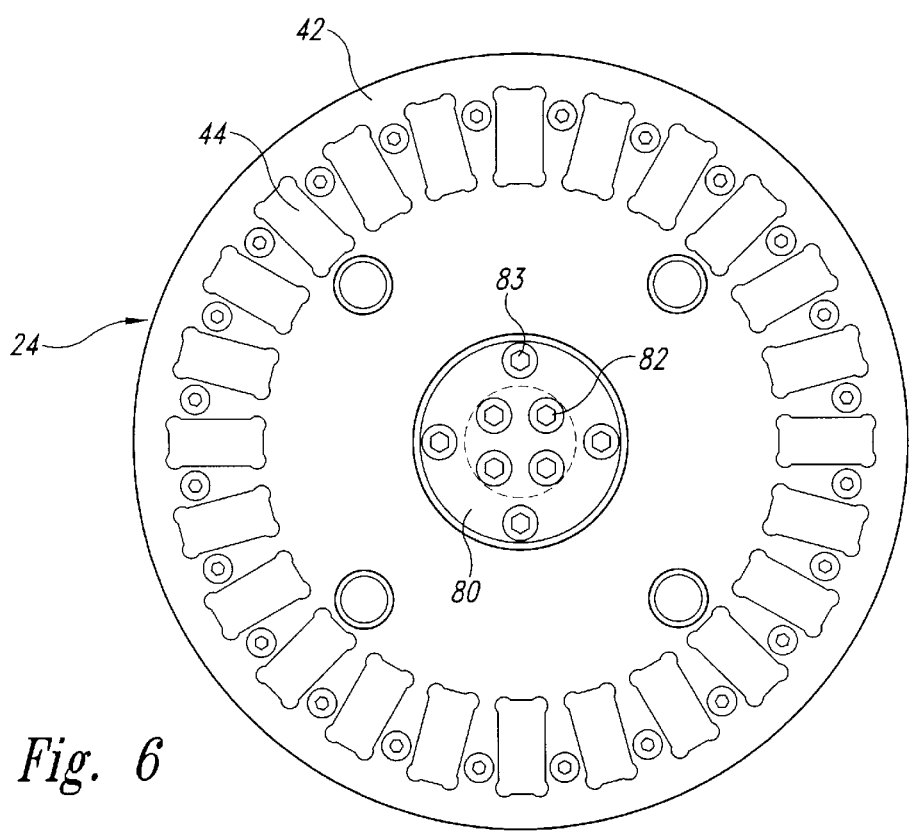
FIG. 6 is an end view of the left hand magnet rotor as viewed looking to the right in FIG. 1 and with the magnets removed.

The fifth rotor 52 can be generally square-shaped in elevation providing four outer edge faces 52a, each of which has a central ear 53 projecting radially therefrom. These ears 53 are formed with threaded radial bores extending toward the shaft 21 from their outer ends to receive shoulder bolts 54 on which bearings 55 are sleeved. The bearings 55 receive center hub portions of swing units 56 each having a pair of swing arms with cam slots 57 formed adjacent their outer ends. These cam slots each receive a cam follower roller 58 to track therein. Each roller 58 projects outwardly from a mounting stud 59 which is secured in a respective block 60 projecting toward the fifth rotor 52 from the mounting disc 42 of the respective magnet rotor. The blocks 60 may be mounted on the discs 42 by a pair of cap screws 60a. When the magnet rotors are retracted the maximum axial distance from the conductor rotors 26–27 as shown in FIG. 1, a respective pair of the blocks 61 extends on opposite sides of each of the ears 53 of the fifth rotor 52 so that the swing units 56 will then be coplanar with the fifth rotor 52 as shown in FIGS. 4–5. This compact arrangement assists in minimizing, the length of the coupler.

With the described slotted rocker arm and follower roller arrangement it is apparent that when the magnet rotor 25 is pushed away from the conductor rotor 27 to increase the width of the air gap 48', the swing units 56 will responsively pivot on the center bolts 54 so that their ends will swing toward the fifth rotor 52. During this swinging movement the rollers 58 track in the slots 57 toward their inner end and as a result the magnet rotor 24 is pulled toward the fifth rotor 52, thereby increasing, the width of the air gap 48 to the same extent as the width of the air gap 48' is increased by the push on the magnet rotor 25. Likewise, when the magnet rotor 25 is pulled toward the conductor rotor 27 to narrow the width of the air gap 48', the swing units 56 will responsively swing on the bolts 54 so that their ends will swing away from the fifth rotor 52, thereby causing the magnet rotor 25 to be pushed toward the conductor rotor 26 and narrow the air gap 48 in correspondence with the narrowing of the air gap 48'.

Figure 7:
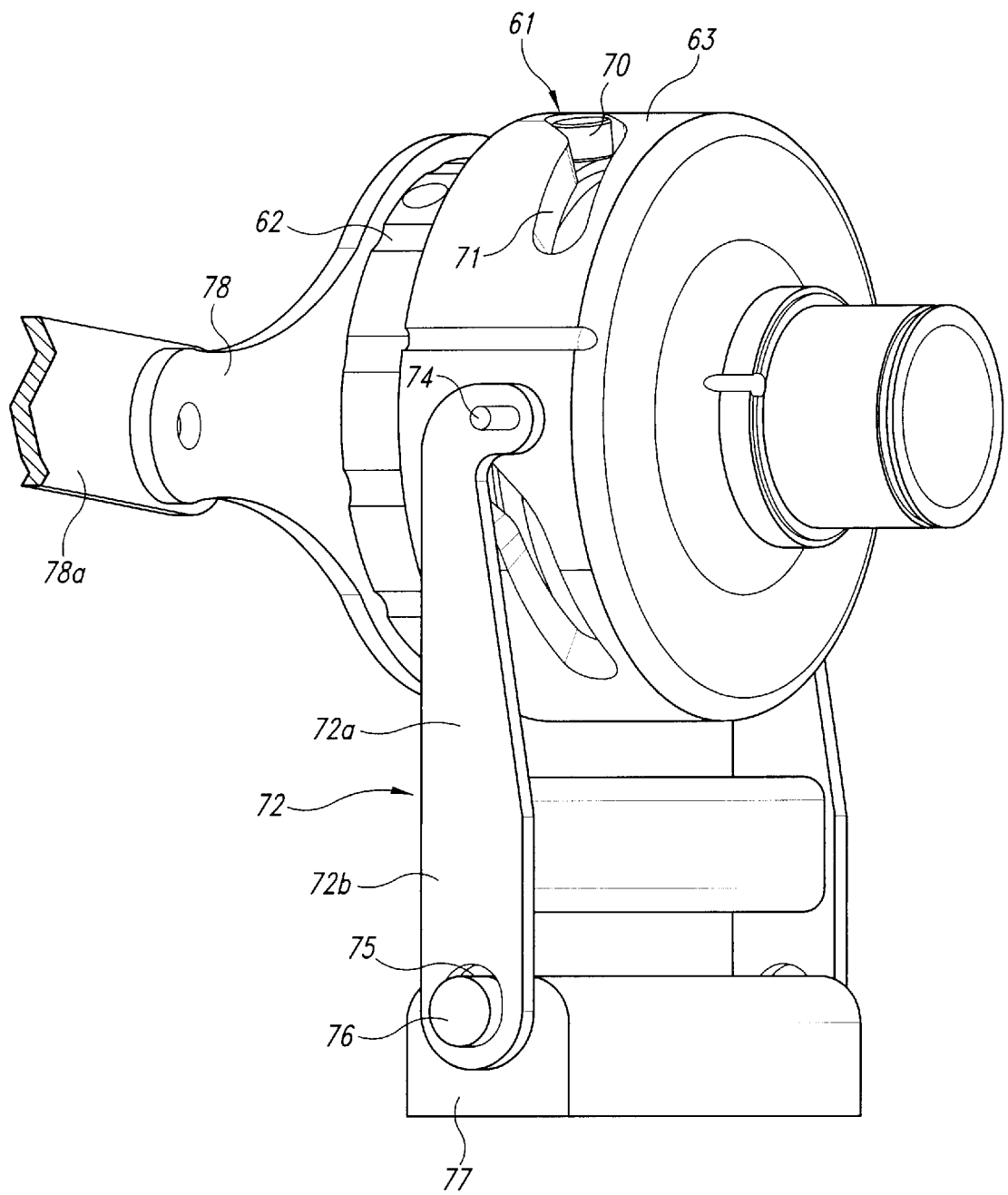
FIG. 7 is a perspective view showing the barrel cam mechanism and related fork.

Pushing and pulling of the magnet rotor 25 to vary the width of the air gaps 48'48' is preferably accomplished by using a barrel cam 61 which has an inner barrel element 62 overlapped by an outer barrel element 63. The inner element 62 is mounted by a bearing unit 64 on the output shaft 21 and the outer element 63 has a neck portion 63a which has clearance with the output shaft 21 and carries a thrust bearing 65 which has its outer race seated in the inner radial end of magnet rotor 25. A bearing cap 66 secured by screws 67 to the disc of the magnet rotor 25 holds the thrust bearing 65 and a seal 68 in position. The inner barrel 62 has a set of cam rollers 70 which project radially outward into curved cam slots 71 in the outer barrel 63. Turning of the outer barrel 63 is prevented by a yoke 72 (FIG. 7) having its arms 72a pivotally connected adjacent their outer ends by rollers extending into holes 73 in the outer barrel from studs 74 mounted in the yoke arms. The yolk 72 has a pair of bottom legs 72b formed with oversized holes 75 receiving cam rollers 76 mounted on studs projecting outwardly from a stationary mounting block 77.

An actuator arm 78 projects outwardly from the inner barrel 62 and is turned in any suitable manner to control the air gaps 48, 48'. Turning of the inner barrel 62 by action of the actuator in one direction causes endwise movement of the outer barrel 63 responsive to movement of the cam rollers 70 in the cam slots 71 which are contoured to give this result. The holes 75 in the yoke legs 72b are sufficiently oversized relative to the rollers 76 to permit the required endwise movement of the outer barrel 63 as the yoke 72 swings responsive to such movement.

Endwise movement of the outer barrel 63 acts through the thrust bearing 65 to correspondingly push or pull the magnet rotor 25. As before described, this results in equal endwise motion of the other magnet rotor 24 in the opposite direction by responsive operation of the rocker arm units 57 and follower rollers 59. Thus, selective movement of the actuator arm 78 results in varying the air gaps 48, 48', and thereby varies the output speed of the magnetic coupler. The actuator arm 78 may, for example, be connected by a link 78a to a stationary electric rotary positioner which is controlled by a process controller. If, for example, the load is a pump whose flow output is to be controlled, a measuring device in the output stream feeds the output data to the process controller which then signals the rotary positioner for the required rotary movement of the actuator arm 78 to properly adjust the output speed of the magnetic coupler.

Preferably, the output shaft 21, rather than being the actual input shaft of the load, is an add-on shaft section as shown in FIG. 1. This add-on section 21 is connected at a necked end portion 21a to the fifth rotor 52 via a round end plate 80 which covers the inner end face of the add-on section 21 and a hub portion 52a of the fifth rotor 52. Sets 82, 83 of bolts connect the end plate 80 to the shaft 21 and fifth rotor hub 52a.

The shaft 21 expands from the necked portion 21a to an intermediate cylindrical portion receiving the bearing 64, and then is formed with an annular shoulder 21c against which the outer end of the inner race of the bearing 64 is sealed. Endwise of the shoulder 21c the output shaft 21 has an outer cylindrical terminal portion 21d receiving a bearing seal 84 and a hub component 86a of coupler 86. The coupler has a complementing adapter hub component 86b with a neck 86c sized to receive the actual input shaft 21' of the load. A wedge-type squeeze unit 87 is sleeved on the coupler neck 86c to force fit the coupler 86 to the shaft 21' responsive to tightening of screws 89. The hub components 86a, 86b of the coupler 86 are secured together by bolts 88, and the coupler is fixed to the shaft section 21 by an annular end plate 90 secured by sets 91, 92 of bolts to the outer end face of the shaft section and to the hub component 86a. A squeeze unit 87 can also be used in conjunction with the hub 36 to secure it to the shaft 20.

The described arrangement incorporating the shaft section 21 and coupler 86 makes it possible to easily install or remove the magnetic coupling of the present invention without moving the load and its related input shaft 21 or the prime mover and its shaft 20.

Figure 8:
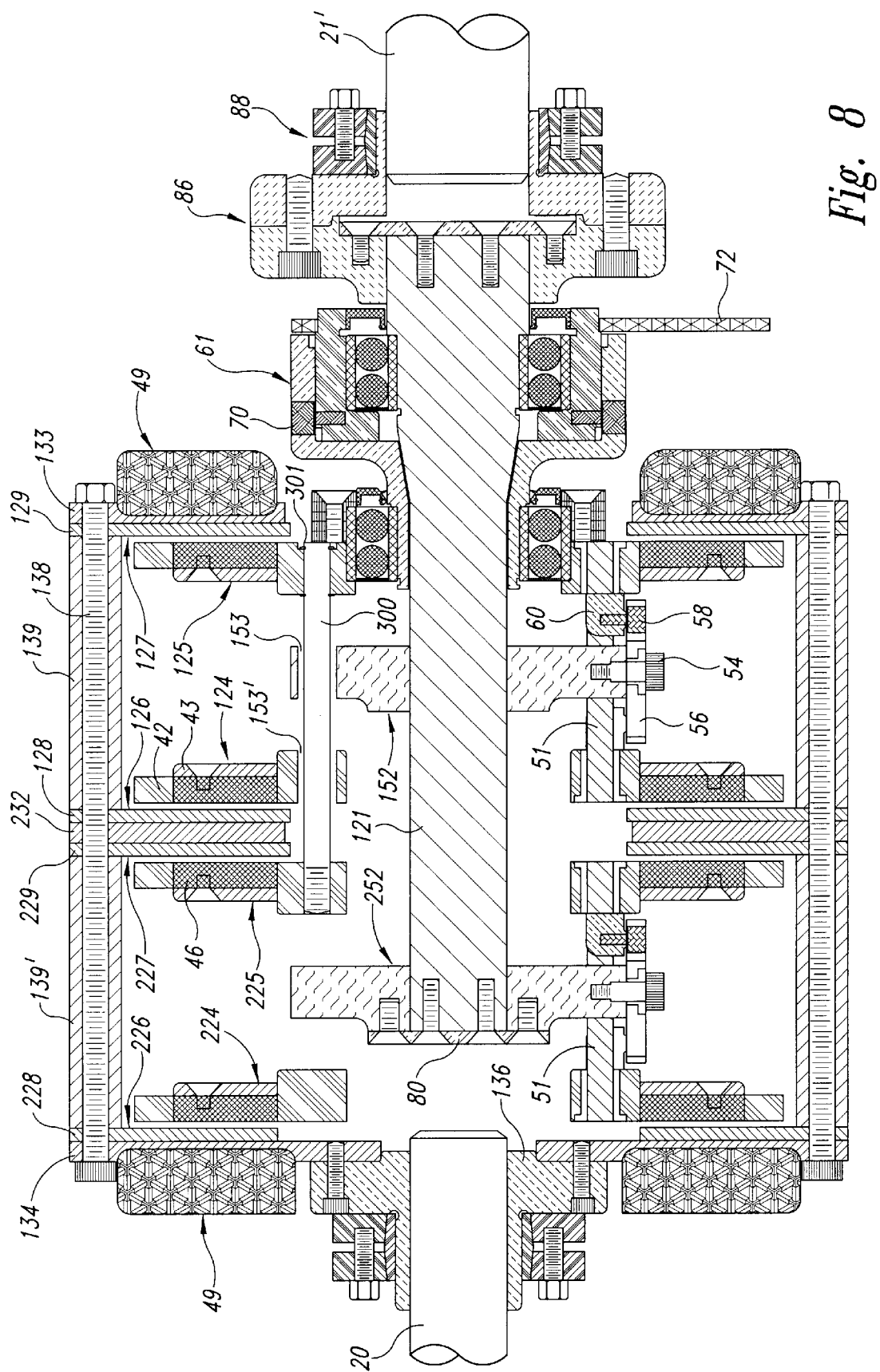
FIG. 8 is a longitudinal sectional view of a second embodiment shown in a wide air gap position.

For some applications of the invention, there is a need to provide the required torque transfer from the input shaft 20 to the output shaft 21 using rotors with a smaller diameter than possible with single pairs of magnet rotors and conductor rotors. As shown in FIG. 8, this need may be satisfied by providing a second pair of magnet rotors on the output shaft, extending the conductor rotor unit to present an additional pair of conductor rotors, and connecting one of the magnet rotors in one of the pairs with the corresponding magnet rotor of the other pair of magnet rotors by a pushpull rod passing freely through the fifth rotor and conductor rotor which are located between the two magnet rotors coupled together by the rod.

In the FIG. 8 embodiment, corresponding parts to the first described embodiment have been given the same reference numerals. The shaft section 21 has been elongated and is designated 121. The two pairs of magnet rotors have been marked 124–125 and 224–225, and the corresponding fifth rotors have been marked 152 and 252. Spaced by air gaps from the magnet rotors 124 and 125 are conductor rotors 126–127, and spaced by air gaps from the magnet rotors 224 and 225 are conductor rotors 226–227. Conductor rotors 126 and 227 have in common a mild steel ring 232 functioning as a backing for conductor ring element 128 of conductor rotor 126 and also for conductor ring element 229 of conductor rotor 227. Conductor rings 129 and 228 are backed by ferrous rings 133 and 134, respectively. The latter is connected to hub 136 mounted on shaft 20. The four conductor rotors are held in properly aligned relation by an array of bolts 138 passing through tubular spacers 139–139'.

Two fifth rotors 152 and 252 are fixed on the shaft 121 so as to be midway between conductor elements 129, 132 and 228, 229. They have the same general configuration as fifth rotor 52 and each has a set of four guide rods 51 supporting the respective pair of magnet rotors 124–125 and 224–225. In addition, the fifth wheel 152 has four clearance openings 153 spaced midway between its guide rods 51 for free passage of push-pull rods 300. These rods also pass freely through openings 153' in the magnet rotor 124. At their inner end the push-pull rods are threaded into the magnet rotor 225 and at their outer end they pass through the magnet rotor 125 and are held in fixed relation thereto by a pair of snap rings 301.

It will be apparent that endwise movement of the magnet rotor 125 will be duplicated by the magnet rotor 225 by way of the push-pull rods 300. This endwise movement is duplicated in the reverse direction by magnet rotors 124 and 224 by way of the action of the swing units 56 and related parts as previously described. Although not preferred, the magnet rotors 124 and 224 can be coupled together by push-pull rods rather than the magnet rotors 125 and 225 being coupled together.

From the foregoing it will be appreciated that, although specific embodiments of the invention have been described herein for purposes of illustration, various modifications may be made without deviating from the spirit and scope of the invention. For example, the magnets 46 may be mounted on the rotors 26–27 such that rotors 26–27 become magnet rotors , and the conductor rings 28–29 may be mounted on the rotors 24–25 such that rotors 24–25 become conductor rotors. This reversal of parts requires no change in the operation of the air gap adjustment mechanism. Thus, the invention is not limited except as by the appended claims.

I claim:

1. An adjustable magnet coupler comprising:
    first and second rotary shafts having a rotary axis;
    two coaxial magnet rotors each containing a respective permanent magnet;
    two coaxial conductor rotors each having a non-ferrous electroconductive element spaced by a width of an air gap from a respective one of said magnets;
    two of said magnet or conductor rotors being spaced apart a fixed axial distance and being mounted as a unit on said first shaft to rotate in unison therewith;

different two of said magnet or conductor rotors being mounted to be moved axially in opposite directions with respect to said second shaft and to rotate in unison therewith;

a first push-pull mechanism connected to one of said different two rotors and operative to move it axially in a selected axial direction in a concentric relation to said second shaft;

an additional push-pull mechanism carried by said second shaft between said different two rotors and connected thereto, said additional push-pull mechanism being operative to move the other of said different two rotors in unison with said one of said different two rotors in a direction of axial travel opposite to said selected axial direction to vary the width of said air gaps equally.

2. An adjustable magnetic coupler according to claim 1 in which one of said two rotors in said unit is spaced radially by a clearance space from said second shaft and said first push-pull mechanism extends through said clearance space to said one of said different two rotors from a control mechanism.

3. An adjustable magnetic coupler according to claim 1 in which both of said two rotors in said unit are said conductor rotors;

and said different two rotors are both said magnet rotors located between said conductor rotors, and in which said push-pull mechanisms are jointly operative to selectively move said magnet rotors axially in unison in opposite directions a selected distance to vary the width of said air gaps between said conductor rotors and said magnet rotors equally.

4. An adjustable magnetic coupler according to claim 1 in which said additional push-pull mechanism includes a fifth rotor fixed to said second shaft at a location between said different two rotors and in which a part of said additional push-pull mechanism extends between said fifth rotor and said different two rotors.

5. An adjustable magnetic coupler according to claim 4 in which said additional push-pull mechanism includes multiple swing units, each of which is centrally swing-mounted on said fifth rotor and has opposite ends slidably interfitting with respective of said different two rotors.

6. An adjustable magnetic coupler according to claim 5 in which said swing units are coplanar with said fifth rotor when said air gaps have a maximum width, and extend at cross angles to said fifth rotor when said air gaps have a minimum width.

7. An adjustable magnetic coupler according to claim 4 in which said different two rotors are supported and slide-mounted on pins projecting from each axial end of said fifth rotor.

8. An adjustable magnetic coupler according to claim 1 in which a control mechanism is operatively associated with said first push-pull mechanism for operating the latter from a stationary position.

9. An adjustable magnetic coupler according to claim 1 in which said first push-pull mechanism comprises a first member mounted to move axially only, and a second member held against axial movement and interconnected with said first member such as to move it axially responsive to turning of said second member, said second shaft being free to rotate independently of said first push-pull mechanism.

10. An adjustable magnetic coupler according to claim 9 in which said first and second members are interconnected by a cam slot in one of said members and a complementary cam roller riding in said slot and mounted on the other of said members.

11. An adjustable magnetic coupler according to claim 9 in which said second member has a lever arm projecting therefrom, and an actuator is connected to said lever arm for selectively swinging it in an arc to selectively turn said second member to responsively axially move said first member and thereby adjust the width of said air gaps.

12. An adjustable magnetic coupler comprising:

first and second coaxial rotary shafts having a rotary axis;

first and second groups of rotors;

said first group having two axially-spaced magnet rotors each containing a respective permanent magnet;

said second group having two axially-spaced conductor rotors each having a nonferrous electroconductive element spaced by a width of an air gap from said respective magnet;

an axial space between the rotors of one of said groups of rotors being fixed and mounted on said first shaft to rotate in unison therewith;

the rotors of the other one of said groups of rotors being in a concentric relation to said second shaft to be movable axially relative to one another along said rotary axis and to rotate together in unison with said second shaft; and push-pull mechanisms operative to axially move one of the two rotors in said other one of said groups of rotors a selected distance in a selected axial direction and operative to axially move the other one of the two rotors in said other one of said groups of rotors an amount equal to said selected distance, but in an axial direction opposite to said selected axial direction so that said air gaps are varied equally.

13. A coupler according to claim 12 in which a fifth rotor is fixed to said second shaft at a location between the rotors of said other one of said groups of rotors, and in which a part of said push-pull mechanisms is a mechanism carried by said fifth rotor.

14. A coupler according to claim 13 in which said mechanism carried by said fifth rotor includes a swing unit which is centrally swing-mounted on said fifth rotor and has opposite ends slidably engaged with the two rotors in said other one of said group of rotors.

15. A coupler according to claim 13 in which said other one of said groups of rotors is slide-mounted on said fifth rotor.

16. An adjustable magnetic coupler according to claim 12 in which the rotors of said one of said groups of rotors which is mounted on said first shaft are said conductor rotors each having an electroconductive ring engaged by a respective ferrous backing member; and in which the rotors of said other one of said groups of rotors are said magnet rotors, each having a respective set of permanent magnets with adjacent magnets arranged with their poles reversed, each said set of permanent magnets being mounted in a respective carrier disc including a respective ferrous backing member engaged by the magnets of said set.

17. An adjustable magnetic coupler according to claim 12 in which said push-pull mechanisms includes a first mechanism for selectively moving one of the two rotors in said other one of said groups of rotors axially a selected distance and a selected direction, and includes a second mechanism located between the rotors of said other one of said groups of rotors for moving the other one of said two rotors in said group axially said selected distance in a direction opposite to said selected direction responsive to an axial movement by said first mechanism of said one of the two rotors in said other one of said groups of rotors.

18. An adjustable magnetic coupler according to claim 17 in which said second mechanism includes a fifth rotor mounted on said second shaft between the rotors in said other one of said groups of rotors, and includes swing units each centrally pivotally mounted by a pivotal mounting on said fifth rotor and engaging with the rotors in said other one of said groups of rotors.

19. An adjustable magnetic coupler according to claim 18 in which the pivotal mounting of each of said swing units on said fifth rotor is on a respective pivot axis extending radially from said rotary axis of said second shaft.

20. An adjustable magnetic coupler according to claim 18 in which each of said swing units has longitudinal slots adjacent its end, and each of said rotors in said other one of said groups of rotors has respective rollers tracking in said slots.

21. An adjustable magnetic coupler according to claim 18 in which said units each have a retracted position coplanar with said fifth rotor when each said air gap is at a maximum, and each have an extended position at which each said air gap is at a minimum.

22. An adjustable magnetic coupler comprising:

first and second shafts having coaxial rotary axes;

a conductor rotor unit mounted on said first shaft to rotate in unison therewith and providing axially aligned first and second groups of electroconductive elements, each of said first and second groups having two respective electroconductive elements facing one another and axially spaced apart;

first and second groups of axially-spaced magnet rotors, each of said first and second groups of magnet rotors having two said magnet rotors and each of said two magnet rotors containing a respective permanent magnet;

each of the two magnet rotors in said first and second groups of magnet rotors being mounted relative to said second shaft so as to be movable axially relative to the other two magnet rotors in said first and second groups along a rotary axis of said second shaft and to rotate together in unison with said second shaft;

said first group of magnet rotors being located between said first group of electroconductive elements and having their permanent magnets spaced by a first pair of air gaps from said electroconductive elements in said first group of electroconductive elements;

said second group of magnet rotors being located between said second group of electroconductive elements and having their permanent magnets spaced by a second pair of air gaps from said electroconductive elements in said second group of electroconductive elements;

and an air gap adjustment mechanism connected to said first and second groups of magnet rotors and operative to axially move the respective magnet rotors in each of said groups axially relative to one another a selected distance in opposite axial directions whereby said first and second pairs of air gaps are varied equally.

23. An adjustable magnetic coupler according to claim 22 in which said air gap adjustment mechanism includes:

a first air gap adjustment mechanism operatively associated with said first group of magnet rotors and operative to axially move them relative to one another a selected distance in opposite axially directions whereby said first pair of air gaps may be varied equally;

and a second air gap adjustment mechanism interconnecting said first and second groups of magnet rotors and operative to axially move said second group of magnet rotors in unison with said first group of magnet rotors whereby said second pair of air gaps may also be varied equally responsive to operation of said first air gap adjustment mechanism.

24. An adjustable magnetic coupler according to claim 22 in which said air gap adjustment mechanism includes:

a first push-pull device for selectively axially moving a first one of said magnet rotors in said first group of magnet rotors;

a second push-pull device for moving a second one of said magnet rotors in said first group of magnet rotors oppositely to axial movement of said first push-pull device;

a third push-pull device for moving a first one of said magnet rotors in said second group in unison with said first push-pull device; and a fourth push-pull device for moving a second one of said magnet rotors in said second group of magnet rotors oppositely to axial movement of said third push-pull device.

25. An adjustable magnetic coupler according to claim 22 in which said magnet rotors are slidably mounted on rods projecting from first and second additional rotors fixed on said second shaft between the magnet rotors in said first and second groups of magnet rotors.

26. An adjustable magnetic coupler according to claim 25 in which swing units are centrally swing-mounted on said additional rotors and have end portions interacting with adjacent of said magnetic rotors so that the magnet rotors in each said group of magnet rotors are caused to move in opposite axial directions.

27. An adjustable magnetic coupler comprising:

first and second rotary shafts having a rotary axis;

first and second groups of rotors, one of said groups having first and second axially-spaced magnet rotors each containing a respective permanent magnet, and the other one of said groups having first and second axially-spaced conductor rotors each having a respective electroconductive element spaced by a respective air gap from a respective one of said magnets;

a distance between the rotors of said first group being fixed, and said first group being mounted on said first shaft to turn in unison therewith;

the rotors of said second group being carried by said second shaft to be movable axially relative to one another along said rotary axis and to rotate together in unison with said second shaft;

a first mechanism operative to axially move the first rotor in said second group a selected distance in a selected axial direction; and a second mechanism operative to move the second rotor in said second group an amount equal to said selected distance and in an axial direction opposite to said selected axial direction to responsively vary said air gaps equally.

28. A coupler according to claim 27 in which a fifth rotor is fixed to said second shaft at a location between the rotors of said second group of rotors, and in which a part of said second mechanism is carried by said fifth rotor.

29. A coupler according to claim 28 in which said second mechanism includes multiple rocker units each of said rocker units is centrally swing-mounted on said fifth rotor and has opposite ends slidable interfitting with the two rotors in said second group of rotors.

30. A coupler according to claim 27 in which said first mechanism includes a non-rotating push-pull device and a thrust bearing assembly which has a non-rotary element connected to said push-pull device for selective axial movement and has a rotary element connected to said first rotor in said second group of rotors so a linear movement of said push-pull device is transferred to a like linear movement of said first rotor in said second group of rotors.

31. An adjustable magnetic coupler comprising:

first and second shafts having coaxial rotary axes;

first and second axially-spaced magnet rotors each containing a permanent magnet;

first and second axially-spaced conductor rotors connected together and each having an electroconductive element spaced by an air gap from a respective one of said magnets and backed by a magnetic material;

a distance between the rotors of said conductor rotors being fixed, said first conductor rotor being mounted on said first shaft to rotate in unison therewith, and said second conductor rotor surrounding said second shaft and being radially spaced therefrom by a clearance space;

said magnet rotors being carried by said second shaft to be movable axially relative to one another along the rotary axis of said second shaft and to rotate together in unison with said second shaft;

and air gap adjustment apparatus operatively associated with said magnet rotors to selectively axially move them relative to one another a selected distance in opposite axial directions whereby said air gaps may be varied equally.

32. An adjustable magnetic coupler comprising:

two units aligned on an axis, said units being connected together and having respective electroconductive elements facing one another and spaced apart, said elements being backed by ferrous elements;

two coaxial magnet rotors mounted for unitary rotation between said units about said axis and each containing a permanent magnet spaced by an air gap from a respective one of said electroconductive elements, said rotors being axially movable relative to one another and relative to said units; and an air gap adjustment mechanism connected to said rotors for selectively moving them axially a selected distance in opposite directions to vary said air gaps while said rotors are rotating.

33. A coupler according to claim 32 in which said rotors are slidably mounted on pins projecting from opposite ends of a member fixed on a rotary shaft which extends through one of said units on said axis so that said rotors can rotate in unison with said shaft while being free to be slidably moved by said air gap adjustment mechanism relative to said shaft on said pins for adjustment of said air gaps.

34. A coupler according to claim 33 in which said member is located centrally between said units and in which said air gap adjustment mechanism includes rocker arms pivotally mounted on said member and slidably interconnected with said rotors so that an endwise movement of one of said rotors causes a like endwise movement of the other one of said rotors, but in an opposite axial direction.

35. An adjustable magnetic device according to claim 33 in which one of said units is spaced radially from said shaft by a clearance space, and a part of said air gap adjustment mechanism extends through said clearance space.

36. An adjustable magnetic device according to claim 32 in which one of said units is spaced radially from said shaft by a clearance space and said air gap adjustment mechanism includes a first push-pull mechanism extending from an outer location through said clearance space and engaging one of said rotors, and includes a second push-pull mechanism between said rotors for axially moving the other one of said rotors responsive to operation of said first push-pull mechanism so that said rotors move in opposite axial directions.

37. An adjustable magnetic device according to claim 36 in which said second push-pull mechanism includes a non-rotary, slide-mounted barrel concentric to said rotary axis and extending through said clearance space, and includes an actuator cooperating with said barrel to selectively move said barrel endwise along said rotary axis.

* * * * *

UNITED STATES PATENT AND TRADEMARK OFFICE
CERTIFICATE OF CORRECTION

PATENT NO.    :   6,005,317
DATED         :   December 21, 1999
INVENTOR      :   Karl J. Lamb It is certified that error appears in the above identified patent and that said Letters Patent is hereby corrected as shown below:

Claim 12, line 11, delete "fixed and mounted " and insert therefor:  --fixed, and such group being mounted--.

Signed and Sealed this

Twenty-fourth Day of April, 2001

Attest:

NICHOLAS P. GODICI

*Attesting Officer*      *Acting Director of the United States Patent and Trademark Office*